Feb. 15, 1938.  W. S. McVAY  2,108,292
FURNACE AND METHOD OF FIRING
Filed April 21, 1936
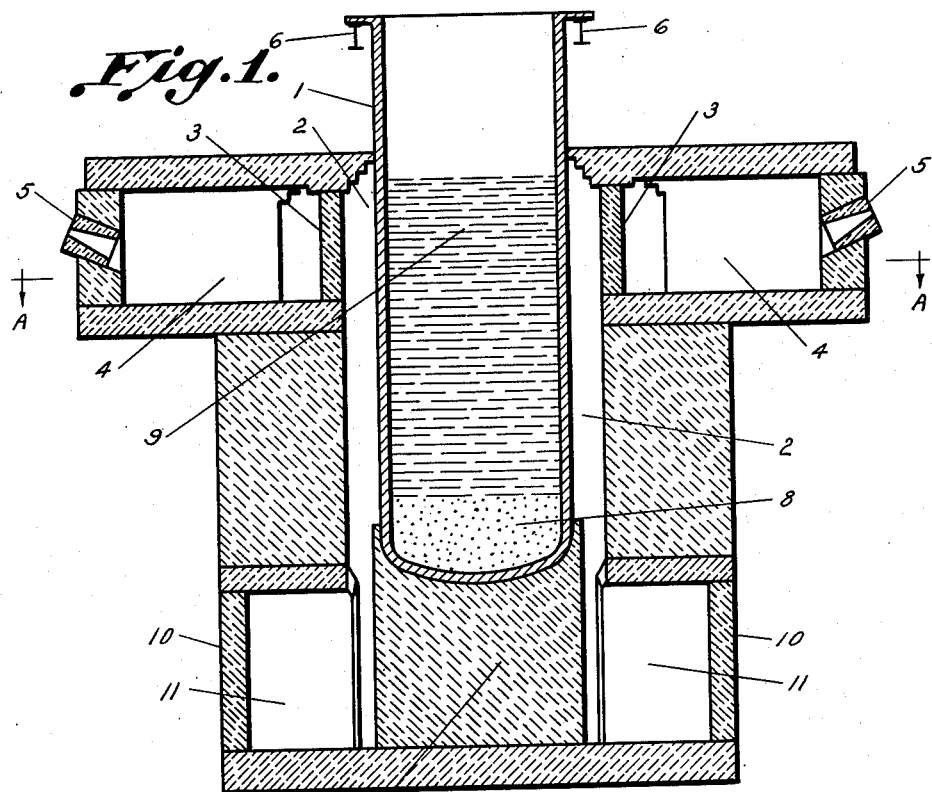
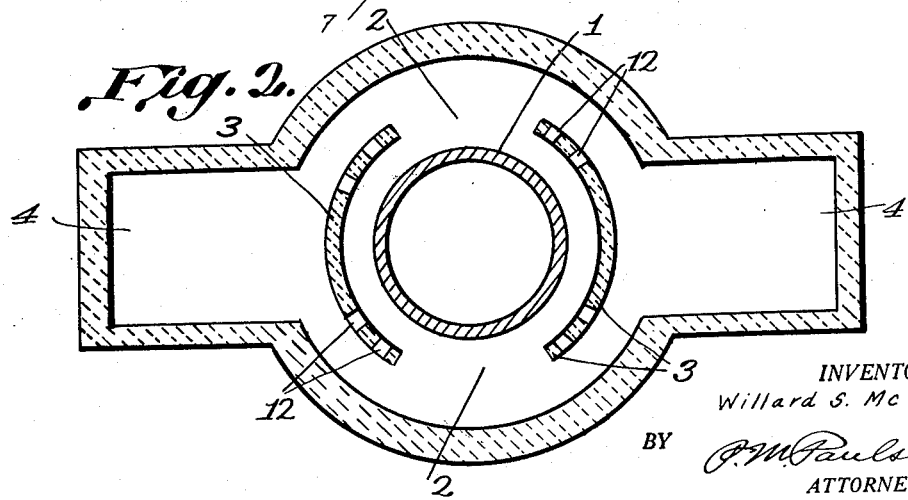
INVENTOR.
Willard S. McVay
BY P. M. Paulson
ATTORNEY Patented Feb. 15, 1938

2,108,292

UNITED STATES PATENT OFFICE 2,108,292

FURNACE AND METHOD OF FIRING

Willard S. McVay, Niagara Falls, N. Y., assignor to E. I. du Pont de Nemours & Company, Wilmington, Del., a corporation of Delaware Application April 21, 1936, Serial No. 75,589

7 Claims. (Cl. 263—14)

This invention relates to a furnace and a method of firing and more particularly, to a combustion furnace adapted to heating various vessels containing liquids.

Furnaces employed in heating vessels containing liquids are normally fired in such a manner that heat is applied most intensely at the bottom of the vessel. While this method of firing is satisfactory for heating in many instances, it has serious disadvantages when employed in heating vessels containing a liquid and a relatively poor heat conducting material located at the bottom of the vessel. An example of this is found in furnaces for heating certain fused salt mixtures in which insoluble materials form and settle to the bottom of the melt. In such cases, if the temperature required is sufficiently high, the bottom of the vessel will fail due to excessive oxidation or to bulging due to internal pressure. Such a bulging frequently occurs at a welded joint and when it does, the vessel may burst under the strain of such pressure. Failures of this sort may result in a large measure from the necessity of applying more intense heat to the bottom than would be necessary if the material inside did not retard the heat transfer to the liquid above. Further the relatively poor transfer of heat thus caused, results in relatively poor heating efficiencies.

Aside from the failure of the vessel, such failure will frequently result in a failure of the furnace setting around and below the vessel. Both vessel and setting failures necessitate costly and time consuming repairs. Failure of the setting is often caused by material leaking from the vessel and fluxing with the refractories of the setting. A failure of the furnace setting may also be due to overheating or the impingement of flame on the wall of the setting.

This invention has as an object a furnace that will lengthen the life of a vessel heated therein, thereby reducing maintenance costs. A further object is a furnace setting that permits firing the furnace in such a manner as to avoid excessive heating of the vessel walls around the bottom portion. A still further object is a method of applying and distributing heat uniformly to a reaction vessel or similar container, so as to afford good transfer of heat to the main contents of the vessel. A still further object is a furnace, the construction of which is such that repairs can be made to those parts most likely to fail without the necessity of tearing out and subsequently rebuilding all or a large part of the furnace setting. These and other objects will be apparent from the following description of the invention.

These objects are accomplished in accordance with the present invention by so directing the course of the heated gases employed in heating an object, that the upper portion of the object is contacted with gases having a relatively high heat content and the bottom portion of the object is contacted subsequently with the same gases whose heat content has been lowered by prior contact with the upper portion of the object. This method of heating may be effectively practiced by employing a combustion furnace, the construction or setting of which insures the application of the most intense heat to the side walls of the object or vessel heated therein, rather than at the bottom of the vessel. These objects may be accomplished in an especially efficient manner in accordance with the present invention by employing a baffle wall between the source of heat and the object or vessel being heated, thereby effecting a more uniform distribution of heat to the surface of the vessel. In its preferred form, this baffle will be shaped to at least partially surround the object heated, and arranged so that the combustion gases impinge initially on the outside surface of the baffle and then come into direct contact with the side walls or bottom portion, or both of the objects heated. It is also preferred to construct the baffle of such wall thickness that a large portion, e. g., 25 to 50% or more of the available heat be conducted to the object heated by radiation from the inner wall of the baffle.

When an object or vessel is heated in a furnace by heat supplied from the combustion of a fuel, the combustion gases are initially at a relatively high temperature which temperature is, in most cases, too high a temperature for the surfaces of the object or vessel to stand. The temperature of these gases may be regulated to a sufficiently low value before they contact the object being heated by using an excess of air during the combustion or by recirculating some of the flue gases. Neither of these methods is wholly satisfactory or efficient. If an excess of air is used, the object or vessel being heated is subjected to a severe oxidizing environment which is usually highly objectionable. If flue gases are recirculated, the efficiency of the heating process is lowered since the flow of the heated gases is increased which results in the escape of increased amounts of heat into the flue.

I prefer to regulate the temperature to which the object being heated is subjected by the use of the previously mentioned baffle between the heat source and the object being heated. The material of which the baffle is made and the thickness and shape of the baffle may be varied as desired to determine the temperature to which the object is subjected. Such a baffle not only reduces the temperature of the combustion gases before they contact the object, but it effects a uniform distribution of the heat to the object at the reduced temperature. This permits the heating to be carried out more efficiently and is, therefore, an improvement over the practices of using an excess of air during the combustion or of recirculating flue gases for accomplishing the purpose of regulating gas temperature prior to the contact of the gases with the object being heated. The use of a suitable baffle is not only an improvement over these less effective methods, but it makes possible the efficient heating of an object or vessel which cannot be subjected to excessively high temperatures by gases which are initially at a much too high temperature.

A type of furnace setting which I have found to be well adapted for my improved method of firing will be hereinafter referred to as "down-fired" setting to distinguish it from the usual type of furnace setting which may conveniently be referred to as the "up-fired" setting.

The invention may be more clearly understood by reference to the accompanying drawing which diagrammatically illustrates one type of "down-fired" furnace setting well adapted for firing metal vessels which may contain molten salt mixtures. Fig. 1 presents a vertical cross-sectional view and Fig. 2 a horizontal cross-sectional view of the same setting through the plane A—A of Fig. 1. From this drawing it is seen that the combustion chambers 4, which are fired by oil burners 5, are situated in the upper portion of the furnace setting so that they are on the same level as the upper portion of the reaction zone 9 of the vessel 1. Further, the combustion chambers are seen to open indirectly into the vessel chamber 2, which incloses the vessel. The carborundum ("Carbofrax") baffle walls 3, into which are built windows 12, prevent direct impingement of flame and intensely heated gases from the combustion chamber upon the walls of the vessel and also prevent direct radiation of heat to the walls of the vessel. The baffle walls, therefore, facilitate a more uniform distribution of heat to the walls of the reaction vessel at an area where heat is most effectively transferred to the reaction mixture.

While preventing direct heat radiation or flame impingement on the side walls of the vessel opposite the burners, in its preferred form, the baffle wall will act to radiate heat to the side walls of the vessel. To attain this radiation effect, I construct the baffle with a relatively thin wall and preferably of a single piece of material, so that it readily may be brought to a red heat or up to incandescence by the action of a flame or flames on the outer portion thereof. On a successful design of this sort, I have been able to conduct around 50% or more of the available heat to the vessel by radiation from the inner wall of the baffle.

The gases from the combustion chambers pass around and through the baffle walls into the upper portion of the vessel chamber, from whence they pass down and around the bottom 8 of the vessel and out through flues 11 situated at the bottom of the setting. The flues are provided with clean-out doors 10. The vessel 1 is supported at the top by the steel beams 6 and at the bottom by the solid pedestal 7. The various parts of the furnace may be constructed of any of the materials commonly employed in constructing furnaces, such as fire brick and various other refractories and insulating materials.

Although the appended figures are presented in mere diagrammatic form, the principal advantages of the "down-fired" setting over the "up-fired" setting are immediately apparent from the drawing. The application of heat is primarily to the side walls of the vessel where the conductance of heat away from the vessel walls to the reaction mixture is greatest when there is present a layer of sludge in the bottom of the vessel. This, together with the application of heat in a more evenly distributed manner as insured by the carborundum baffle walls, subjects the walls of the vessel to the minimum temperature necessary to carry out the desired reaction and avoids bulging of the vessel at the point of maximum heat due to the reduced internal pressure at the higher zone of maximum heat. Aside from avoiding excessive application of heat to the bottom of the vessel, it should be noted that in the new setting the zones of most severe refractory service are so located that they can be easily and quickly repaired without removing the vessel or tearing down virtually the entire setting as is generally the case with the "up-fired" setting.

Further, the "down-fired" setting avoids overloading of the refractories in that the vessel is partially supported by a solid pedestal at the base and also by supporting steel beams at the top. Preferably, the bottom supporting pedestal will cover the bottom of the vessel and in part act as heat insulator for the same. In addition, the hottest portion of the setting is at the top of the vessel chamber where the compressive stress on the walls of the chamber is lowest. Another important advantage is that the new setting decreases fuel consumption. This increase of firing efficiency results from the improved heat distribution and the application of heat where it is more quickly conducted to the reaction mixture or liquid in the vessel. The increased efficiency also results in a shorter time necessary to have the burners in service and frequently makes possible a decrease in the cycle of vessel operations with corresponding decreased labor costs. Since, with the new setting, the bottom of the vessel is no longer overheated and therefore is not quickly burned out, it is not necessary that the vessels be provided with extraordinarily heavy bottoms.

A baffle wall similar to that illustrated in the accompanying drawing of a "down-fired" setting may be effectively used in any type of combustion furnace. It may be constructed of any suitable material and conform to any shape without departing from the scope and spirit of the present invention. I have found, however, that carborundum is very suitable as a construction material for such a baffle when the temperature of the impinging gases and flames is in the neighborhood of 1000° C. or higher. Aside from being a good refractory, it is a comparatively good heat conductor which property permits an indirect transfer of radiant heat from the heat source to the object. The baffle wall functions most effectively when its shape conforms roughly to the shape of that portion of the object heated which is adjacent to it. The drawing illustrates a baffle wall into which has been constructed windows which permit movement of part of the gases through the wall. Such windows should be so located that they do not form direct paths for gases from the combustion chambers to the walls of the vessel being heated.

The "down-fired" setting for a furnace may be advantageously used in furnaces for heating many objects and types of vessels and reaction pots. It may be employed with good success for heating among others, caustic pots and bisulphate pots as well as for heating direct fired autoclaves.

In addition, it may be used successfully in heating nitre pots, heat treating pots and oil stills. I have found the "down-fired" setting to be excellently adapted to furnaces for heating metal reaction pots employed in the manufacture of sodium cyanide from sodium, charcoal and ammonia. In the reaction in question there invariably is present in the bottom of the pot a sludge which is a poorer conductor of heat than is the reaction mixture proper. When using the "up-fired" setting with the usual application of heat at the bottom, the life of the pot is relatively short due to the burning-out and bulging of the pot walls. Such pot failures always cause failures of the bottom of the setting since material from the pot readily fuses with the hot refractories of the bottom portion of the setting. With failure of either pot or setting at the bottom, the necessary repairs are time consuming and costly.

Long experience in firing cyanide reaction pots has shown that the life of such a pot, when fired by a furnace having the usual "up-fired" setting, is considered to be good when the pot is used from 175 to 200 reaction cycles before pot failure occurs. When using a "down-fired" setting constructed and operated in accordance with the herein described invention, similar to that shown by the appended drawing, under somewhat more severe conditions of temperature than normally employed, the life of a similar reaction pot was increased to 387 reaction cycles. When pot failure finally did occur, no damage resulted to the refractories of the furnace and therefore only pot repairs were required. Actually the life of the pot might well have been longer than it was since during the first 50 cycles of operation the temperature was approximately 50° C. higher than is commonly employed.

It is understood that this invention is not limited by the descriptions and illustrations herein disclosed. Other modifications and adaptations of the invention will be readily apparent to those skilled in the construction and operation of furnaces. It is evident that a "down-fired" setting may be employed advantageously for heating any type of vessel and is especially advantageous for heating a vessel whose contents include a layer of sludge or solid material at the bottom. Any of these obvious modifications are within the scope and spirit of my invention and are understood to be part of my invention.

I claim:

1. A furnace comprising a combustion chamber situated on a higher plane than the lower portion of the object being heated and horizontally opposite a higher portion of said object, a chamber enclosing said object and connecting indirectly at the top through and around a baffle wall with the combustion chamber and at the bottom with a flue, said baffle wall being situated horizontally between the combustion chamber and the object being heated and being adapted to prevent direct impingement of flame and gases from the combustion chamber upon said object.

2. A furnace suitable for heating a vessel whose contents include a relatively good heat conducting upper zone and a relatively poor heat conducting lower zone comprising a combustion chamber situated on a higher plane than said lower zone and horizontally opposite said upper zone, a vessel chamber enclosing said vessel and connecting indirectly at the top through and around a baffle wall with the combustion chamber and at the bottom with a flue, said baffle wall being situated horizontally between the combustion chamber and the vessel and being adapted to prevent direct impingement of flame and gases from the combustion chamber upon said vessel.

3. A furnace suitable for heating a metal vessel whose contents include an upper molten zone and a lower relatively poor heat conducting sludge zone, comprising a combustion chamber situated on a higher plane than said lower zone and horizontally opposite said upper zone, a vessel chamber enclosing said vessel and connecting indirectly at the top through and around a baffle wall with the combustion chamber and at the bottom with a flue, said baffle wall being situated horizontally between the combustion chamber and the vessel and being adapted to prevent direct radiation of heat and direct impingement of flame and gases from the combustion chamber upon said vessel.

4. A furnace suitable for heating a metal vessel whose contents include an upper molten zone and a lower relatively poor heat conducting sludge zone, comprising a combustion chamber situated on a higher plane than said lower zone and horizontally opposite said upper zone, a vessel chamber enclosing said vessel and connecting indirectly at the top through and around a carborundum baffle wall with the combustion chamber and at the bottom with a flue, said baffle wall being situated horizontally between the combustion chamber and the vessel and being perforated with windows in those portions of the wall which do not fall on a direct line between the combustion chamber and the vessel.

5. A method of firing a furnace comprising directing a flame and heated gases from a combustion chamber against a baffle positioned between said chamber and the upper portion of a vessel being heated and adapted to prevent direct impingement of said flame and gases upon the walls of said vessel, and continuing the passage of said heated gases after contact with the upper portion of said vessel down and around the lower portion of said vessel.

6. A method of firing a furnace comprising directing heated gases from a combustion chamber around the upper portion of a vessel whose contents comprise a relatively poor heat conducting lower zone and a relatively good heat conducting upper zone while having positioned between said combustion chamber and the upper portion of said vessel a baffle adapted to prevent direct impingement of flame and heated gases upon the walls of said vessel, and continuing the passage of said gases from around the upper portion of said vessel down and around the lower portion of said vessel.

7. A method of firing a furnace comprising passing heated gases from a combustion chamber through and around a baffle and then into contact with the upper portion of a vessel whose contents include a relatively poor heat conducting lower zone and a relatively good heat conducting upper zone and continuing the passage of said gases from around said upper portion of said vessel down and around the lower portion of said vessel, said baffle being positioned between said combustion chamber and the upper portion of said vessel and adapted to prevent direct impingement of flame and heated gases upon the walls of said vessel.

WILLARD S. McVAY.